(12) United States Patent
Dobek et al.

(10) Patent No.: US 9,169,807 B2
(45) Date of Patent: Oct. 27, 2015

(54) CONVEX THERMAL SHIELD FOR ROCKET ENGINE WITH EXTENDABLE DIVERGENT NOZZLE

(75) Inventors: Olivier Dobek, Saint Cyr L'ecole (FR); Noel David, Breuilpont (FR); Nicolas Ravier, Vernon (FR)

(73) Assignee: SNECMA, Paris (FR)

( * ) Notice: Subject to any disclaimer, the term of this patent is extended or adjusted under 35 U.S.C. 154(b) by 844 days.

(21) Appl. No.: 13/395,344

(22) PCT Filed: Sep. 6, 2010

(86) PCT No.: PCT/FR2010/051844
§ 371 (c)(1),
(2), (4) Date: Mar. 9, 2012

(87) PCT Pub. No.: WO2011/030048
PCT Pub. Date: Mar. 17, 2011

(65) Prior Publication Data
US 2012/0167575 A1 Jul. 5, 2012

(30) Foreign Application Priority Data
Sep. 10, 2009 (FR) ...................................... 09 56178

(51) Int. Cl.
*F02K 1/09* (2006.01)
*F02K 9/97* (2006.01)

(52) U.S. Cl.
CPC ...................................... *F02K 9/976* (2013.01)

(58) Field of Classification Search
CPC ................................ F02K 9/979; F02K 9/9796
USPC ............................ 60/771; 239/265.11, 265.19
See application file for complete search history.

(56) References Cited

U.S. PATENT DOCUMENTS

| 3,156,091 | A | * | 11/1964 | George | 239/265.11 |
| 3,215,373 | A | * | 11/1965 | Price | 244/74 |
| 3,346,186 | A | * | 10/1967 | Fulton et al. | 239/265.33 |
| 3,933,310 | A | * | 1/1976 | Hickox | 239/265.43 |
| 4,313,567 | A | * | 2/1982 | Feight | 239/265.33 |

(Continued)

FOREIGN PATENT DOCUMENTS

FR 0 516 519 12/1992

OTHER PUBLICATIONS

U.S. Appl. No. 13/384,477, filed Feb. 2, 2012, Dobek, et al.

(Continued)

*Primary Examiner* — Phutthiwat Wongwian
*Assistant Examiner* — Lorne Meade
(74) *Attorney, Agent, or Firm* — Oblon, McClelland, Maier & Neustadt, L.L.P.

(57) ABSTRACT

A rocket engine with an extendible exit cone including an exhaust nozzle for gas from a combustion chamber, the nozzle presenting a longitudinal axis having a first portion defining a nozzle throat and a stationary first exit cone segment, at least one extendible second exit cone segment of section greater than the section of the stationary first exit cone segment, and an extension mechanism for extending the extendible second exit cone segment, the mechanism being located outside the first and second exit cone segments. A rigid thermal protection shield is interposed between the extension mechanism and the stationary first exit cone segment. The thermal protection shield presents a convex wall on its face facing towards the stationary first exit cone segment.

9 Claims, 3 Drawing Sheets

(56) References Cited

U.S. PATENT DOCUMENTS

| | | | |
|---|---|---|---|
| 4,383,407 A | | 5/1983 | Inman |
| 4,387,564 A | * | 6/1983 | Carey ............................... 60/242 |
| 4,779,799 A | * | 10/1988 | Jencek ..................... 239/265.19 |
| 5,048,289 A | | 9/1991 | Brown |
| 5,232,534 A | | 8/1993 | Hocquellet |
| 5,282,576 A | | 2/1994 | Chatenet et al. |
| 5,954,491 A | * | 9/1999 | Helton et al. ................. 431/159 |
| 6,817,184 B2 | * | 11/2004 | Groeber et al. ................. 60/770 |
| 7,011,260 B2 | * | 3/2006 | Ozawa ........................... 241/57 |
| 7,299,636 B2 | | 11/2007 | Roth et al. |
| 8,245,513 B2 | * | 8/2012 | Huth et al. ...................... 60/752 |
| 2007/0062198 A1 | * | 3/2007 | Huth et al. ...................... 60/752 |

OTHER PUBLICATIONS

U.S. Appl. No. 13/384,469, filed Feb. 28, 2012, Dobek, et al.
International Search Report Issued Dec. 6, 2010 in PCT/FR10/51844 Filed Sep. 6, 2010.

* cited by examiner

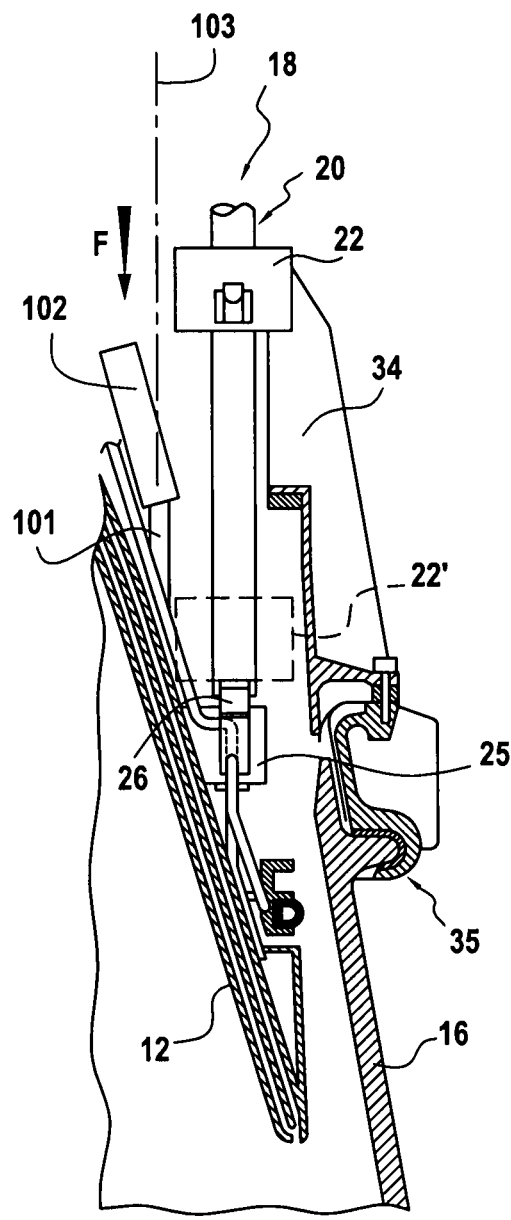
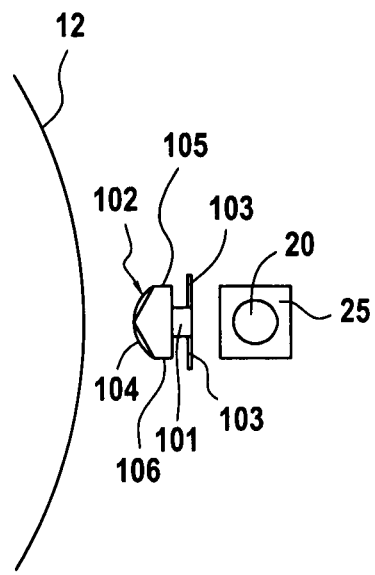
FIG.3
FIG.4

CONVEX THERMAL SHIELD FOR ROCKET ENGINE WITH EXTENDABLE DIVERGENT NOZZLE

FIELD OF THE INVENTION

The present invention relates to a rocket engine with an extendible exit cone, comprising an exhaust nozzle for gas from a combustion chamber, said nozzle presenting a longitudinal axis and having a first portion defining a nozzle throat and a stationary first exit cone segment, at least one extendible second exit cone segment of section greater than the section of the stationary first exit cone segment, and an extension mechanism for extending the second exit cone segment, the mechanism being located outside the first and second exit cone segments.

PRIOR ART

Rocket engine nozzles having extendible exit cones are frequently used, in particular on launcher stages, where such exit cones enable the outlet section of the nozzle to be adapted as a function of ambient pressure, which pressure decreases climbing from low altitudes close to the ground to high altitudes where the space vehicle leaves the earth's atmosphere, thus enabling optimized thrust to be conserved in spite of changes in altitude.

The extendible portion of the exit cone is deployed automatically under electrical, or hydraulic, or even pneumatic control.

Examples of extendible exit cones for rocket engine nozzles are described in particular in the following documents: U.S. Pat. Nos. 4,383,407, 5,048,289, EP 0516519 B1, and U.S. Pat. No. 7,299,636 B2.

Extendible exit cones of substantially conical shape may be made of metal with regenerative cooling circuits, or they may be made of composite material.

In particular, the Vinci engine is known that is a rocket engine using cryogenic propellant components and an extendible exit cone made of thermostructural composite material, and it has an exit cone extension mechanism (ECEM) made up of a wormscrew and a fastener system for fastening firstly to the upper conical portion, itself fastened to the structure of the combustion chamber, and secondly to the movable lower conical portion of the exit cone.

The extension mechanism is situated facing the exit cone, and in operation of the rocket engine the exit cone emits a flux of thermal radiation that may, at certain locations, be as great as 250 kilowatts per square meter of exit cone.

This strong incident heat flux gives rise to an overall increase in the temperature of the elements constituting the extension mechanism, thereby contributing to reducing their mechanical properties, and under certain circumstances can even damage the integrity of these elements and lead to some of them being destroyed.

OBJECT AND SUMMARY OF THE INVENTION

The invention seeks to remedy the above-mentioned drawbacks and to increase the reliability of a rocket engine with an extendible exit cone by minimizing the effects of the thermal radiation emitted by the exit cone while the rocket engine is in operation.

In accordance with the invention, these objects are achieved by a rocket engine with an extendible exit cone, comprising an exhaust nozzle for gas from a combustion chamber, said nozzle presenting a longitudinal axis and having a first portion defining a nozzle throat and a stationary first exit cone segment, at least one extendible second exit cone segment of section greater than the section of the stationary first exit cone segment, and an extension mechanism for extending the extendible second exit cone segment, the mechanism being located outside the first and second exit cone segments, the rocket engine being characterized in that it further comprises a rigid thermal protection shield interposed between the extension mechanism and the stationary first exit cone segment, and in that the thermal protection shield presents a convex wall on its face facing towards the stationary first exit cone segment.

Advantageously, the thermal protection shield further comprises side fins on either side of said convex wall.

Preferably, the rocket engine further comprises a flexible thermal protection strip arranged between the rigid thermal protection shield and the extension mechanism.

Advantageously, the flexible thermal protection strip extends over the full height of the stationary first exit cone segment while the rigid thermal protection shield extends over only the lower portion of the stationary first exit cone segment.

Advantageously, the rigid thermal protection shield is made of a refractory metal material, such as an alloy of tungsten and/or of molybdenum.

Advantageously, the flexible thermal protection strip is made of an alumina fiber and borosilicate fabric.

In a particular embodiment, the extension mechanism comprises a wormscrew secured to the stationary first exit cone segment and a ball nut engaged on the wormscrew and secured to the upper portion of the movable second exit cone segment.

Advantageously, the ball nut is connected to the upper portion of the movable second exit cone segment by a fin-shaped part.

BRIEF DESCRIPTION OF THE DRAWINGS

Other characteristics and advantages of the invention appear from the following description of particular embodiments given as examples and with reference to the accompanying drawings, in which:

FIG. 3 is a detail view showing an example of an exit cone extension mechanism fitted with an example of a thermal protection system of the present invention;

FIG. 4 is a plan view of the thermal protection system of the invention seen looking along arrow F in FIG. 3.

DETAILED DESCRIPTION OF PREFERRED EMBODIMENTS

Figure 1:
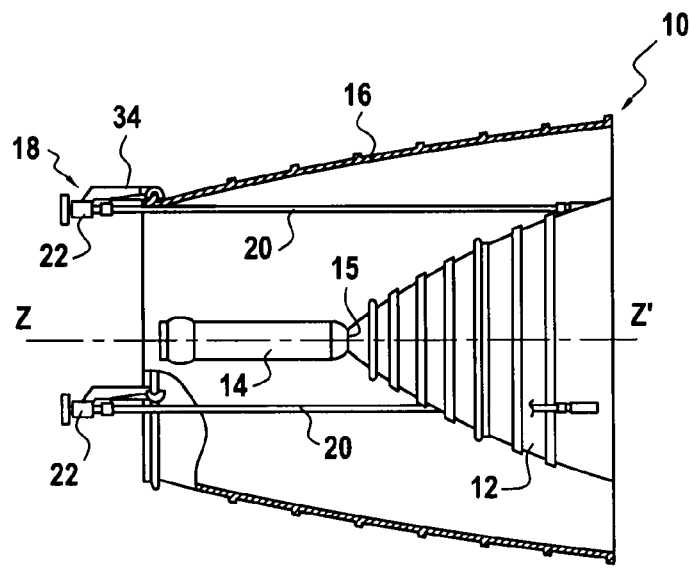
FIG. 1 is a side view, partially in longitudinal section, showing an example of an extendible rocket-engine exit cone in the retracted position, to which the invention is applicable.
Figure 2:
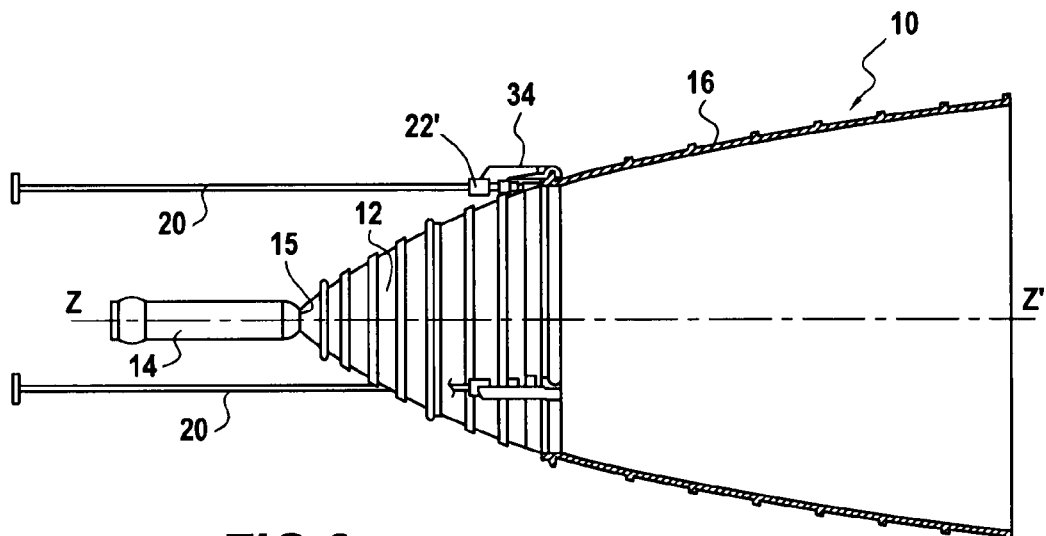
FIG. 2 is a side view, partially in section, showing the FIG. 1 extendible exit cone in the extended position.

FIGS. 1 and 2 show an example of a rocket engine having a combustion chamber 14 with a nozzle 10 of longitudinal axis ZZ' attached thereto, the nozzle including a nozzle throat 15 and an extendible exit cone.

The nozzle 10 comprises a first portion fastened to the combustion chamber 14 and defining the nozzle throat 15, and a segment 12 of a stationary exit cone portion that is substantially frustoconical in shape, together with a second portion constituted by an extendible segment 16 of the exit cone that is substantially frustoconical in shape with a section that is greater than the section of the stationary exit cone segment 12.

An exit cone extension mechanism (ECEM) 18 enables the position of the extendible exit cone segment 16 relative to the nozzle of the stationary exit cone segment 12 to be modified in selective manner.

FIG. 1 shows the extendible exit cone segment 16 placed in its retracted position around the stationary exit cone segment 12 and the combustion chamber 14. This retracted position may correspond to a period during which an upper stage rocket engine of a launcher is being transported. The retracted position may also correspond to a first period of operation in which the combustion gas escapes solely through the stationary exit cone segment 12.

FIG. 2 shows the extendible exit cone segment 16 in the extended position in which the exit cone segment 16 extends the stationary exit cone segment 12 downstream so as to create an exit cone of greater length and of greater outlet diameter.

The exit cone extension mechanism 18 may be made in various ways, e.g. with lever arms or with guide rods.

In the embodiment shown in FIGS. 1 to 4, the exit cone extension mechanism 18 comprises a plurality of rods 20 (e.g. three to six rods) that are parallel to the axis ZZ', each having a wormscrew 26 co-operating with a ball nut 22. Each rod 20 is fastened at its bottom end to a fastener block 25 that is mounted on the downstream portion of the stationary exit cone segment 12. The rods 20 have upper ends secured to the support structure of the rocket engine (not shown in the drawings). Each ball nut 22 co-operating with the wormscrew 26 of a guide rod 20 is itself connected to the upper portion of the extendible exit cone segment 16. The connection element between the ball nut 22 and the extendible exit cone segment 16 may comprise a plate 34 in the form of a fin capable of dumping the heat it receives and a clamp 35 fastened to the upper portion of the extendible exit cone segment 16.

In the retracted position of the extendible exit cone segment 16, as shown in FIG. 1, the ball nut 22 of the extension mechanism 18 and the fastener plates 34 are situated in a high position on the rods 20.

In the deployed position of the extendible exit cone segment 16, as shown in FIG. 2, the ball nuts 22 (referenced 22' in this position in FIGS. 2 and 3) and the fastener plates 34 are situated close to the junction between the stationary exit cone segment 12 and the extendible exit cone segment 16.

The wall of the stationary exit cone segment 12 may be made of metal, and it is then advantageous for said wall to be cooled by a regenerative cooling circuit. The wall of the stationary exit cone segment 12 and the wall of the extendible exit cone segment 16 may also advantageously be made of composite material, e.g. a ceramic matrix material.

While the rocket engine is operating in the deployed position of the extendible exit cone segment 16, the exit cone and in particular the stationary exit cone segment 12 emit a flux of thermal radiation that may, in certain locations of the exit cone, be as great as 250 kilowatts per square meter ($kW/m^2$), with the exit cone itself reaching temperatures that may be in excess of 1400 K.

In accordance with the invention, a thermal protection shield 102 connected by connection means 101 to the stationary downstream portion of the stationary exit cone segment 12 is interposed between the stationary exit cone segment 12 and the exit cone extension mechanism 18 in order to protect the mechanism from the thermal radiation emitted by the exit cone.

The rigid heat shield 102 protects the bottom portion of the exit code extension mechanism 18.

Figure 5:
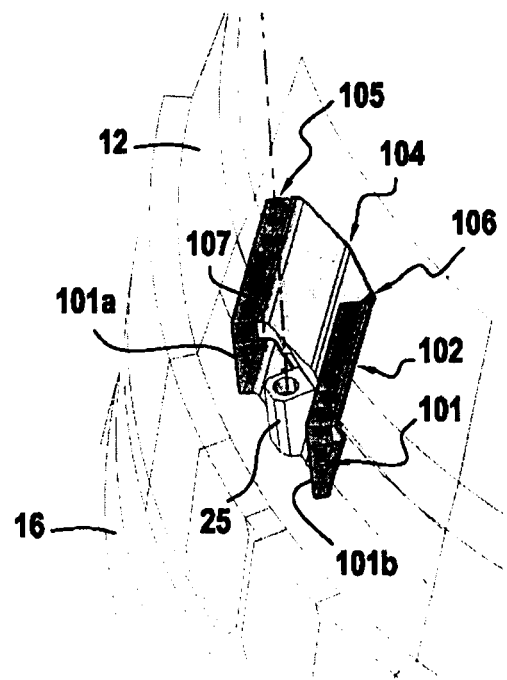
FIGS. 5 and 6 are perspective views showing example shields suitable for use in the thermal protection system of the invention.

As can be seen in FIGS. 3 to 5, the heat shield 102 presents a wall 104 that is convex on its face facing towards the stationary exit cone segment 12.

The convex shape of the shield 102 enables its sight factor relative to the stationary exit cone segment 12 to be reduced, thereby enabling it to radiate into interstellar space, such that the shield 102 serves to reduce the overheating of the exit cone.

The convex shape of the heat shield 102 also increases its stiffness relative to a flat shield.

Side fins 105, 106 are advantageously formed on the heat shield 102 on either side of the convex wall 104 so as to increase heat exchange by radiation to interstellar space and also so as to contribute to stiffening the structure.

In the example of FIG. 5, the connection means 101 for connecting the thermal protection shield 102 to the stationary downstream portion of the stationary exit cone segment 12 comprise a fastener strip that is connected via curved side ends 101a and 101b constituting connection tabs to the side fins 105, 106 of the heat shield 102, a slot 107 being arranged between the convex wall 104 and the fastener strip 101.

Figure 6:
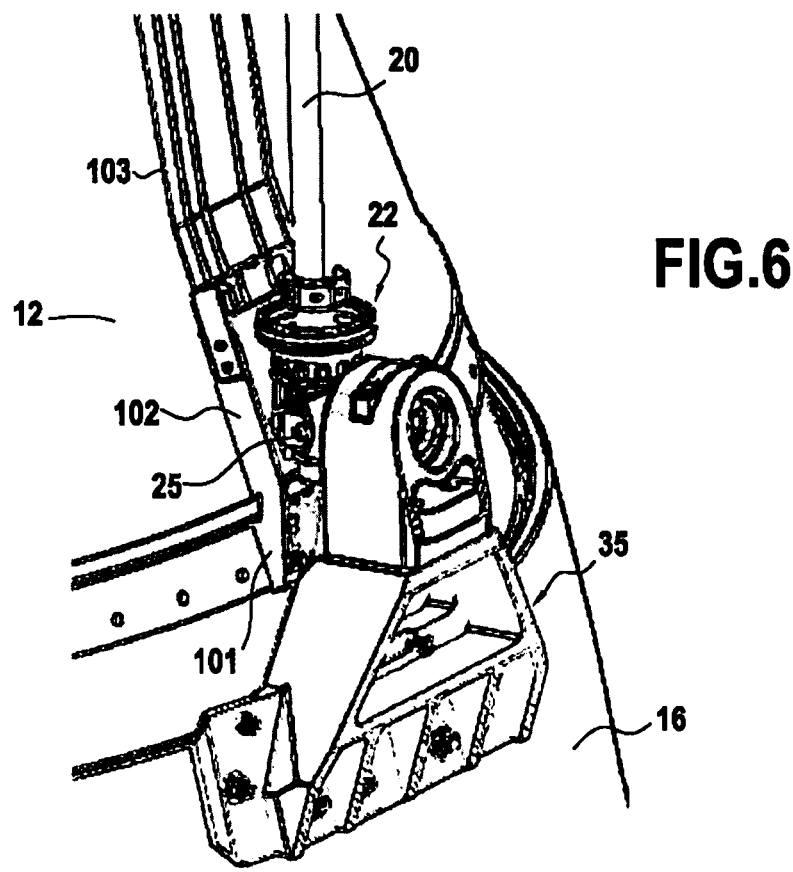

Advantageously, a flexible thermal protection strip 103 is arranged between the rigid thermal protection shield 102 and the exit cone extension mechanism 18 (see FIGS. 3 and 6).

The flexible thermal protection strip 103 extends over the full height of the stationary exit cone segment 12, whereas the rigid thermal protection shield 102 extends over only the bottom portion of the stationary exit cone segment 12.

The flexible thermal protection strip 103 is thus arranged between each rod 20 and the stationary exit cone segment 12. It is not deployable, thereby making it easier to install. The flexible thermal protection strip 103 enables the rods 20 to be light in weight and to exchange heat with space by radiation. Such flexible thermal protection does not generate a thermomechanical load at the interfaces and its weight remains low.

The rigid thermal protection shield 102 itself presents height that is limited so as to avoid increasing weight excessively while protecting the most sensitive lower portion of the exit cone extension mechanism 18. The convex wall 104 of the shield 102 may present a section that is curved or that corresponds to a portion of a polygon.

By means of the rigid thermal shield 102 and the flexible thermal protection strip 103, temperature is reduced at the exit cone extension mechanism 18 so the mechanism does not run the risk of being damaged during operation.

Advantageously, the thermal protection shield 102 may be made of a refractory metal material such as an alloy based on tungsten, molybdenum, or tungsten and molybdenum, and the flexible thermal protection strip 103 may be made of an alumina fiber and borosilicate fabric.

The invention claimed is:

1. A rocket engine with an extendible exit cone, comprising:
    an exhaust nozzle for gas from a combustion chamber, the nozzle presenting a longitudinal axis and including a first portion defining a nozzle throat and a stationary first exit cone segment, at least one extendible second exit cone segment of section greater than the section of the stationary first exit cone segment, and an extension mechanism for extending the extendible second exit cone segment, the mechanism being located outside the first and second exit cone segments; and
    a rigid thermal protection shield interposed between the extension mechanism and the stationary first exit cone segment, wherein the thermal protection shield presents a convex wall on its face facing towards the stationary first exit cone segment, wherein the thermal protection shield further comprises side fins on either side of the convex wall, and wherein said rocket engine further comprises a flexible thermal protection strip arranged between the rigid thermal protection shield and the extension mechanism.

2. A rocket engine according to claim 1, wherein the flexible thermal protection strip extends over a full height of the stationary first exit cone segment while the rigid thermal protection shield extends over only a lower portion of the stationary first exit cone segment.

3. A rocket engine according to claim 1, wherein the rigid thermal protection shield is made of a refractory metal material.

4. A rocket engine according to claim 3, wherein the rigid thermal protection shield is made of a tungsten alloy, of a molybdenum alloy, or of a tungsten and molybdenum alloy.

5. A rocket engine according to claim 1, wherein the flexible thermal protection strip is made of an alumina fiber and borosilicate fabric.

6. A rocket engine according to claim 2, wherein the flexible thermal protection strip is made of an alumina fiber and borosilicate fabric.

7. A rocket engine according to claim 1, wherein the extension mechanism comprises a wormscrew secured to the stationary first exit cone segment and a ball nut engaged on the wormscrew and secured to the upper portion of the movable second exit cone segment.

8. A rocket engine according to claim 7, wherein the ball nut is connected to the upper portion of the movable second exit cone segment by a fin-shaped part.

9. A rocket engine according to claim 1, wherein the side fins of the thermal protection shield are connected to tabs that are secured to a fastener strip on the downstream portion of the stationary first exit cone segment.

* * * * *